ELECTRONIC SIGNAL SEEKING RECEIVER

Filed Nov. 3, 1948

INVENTOR
HUNTER C. GOODRICH, JR.
BY Philip A. Cooper
ATTORNEY

Patented June 24, 1952

2,601,384

UNITED STATES PATENT OFFICE 2,601,384

ELECTRONIC SIGNAL SEEKING RECEIVER

Hunter C. Goodrich, Jr., Collingswood, N. J., assignor to Radio Corporation of America, a corporation of Delaware Application November 3, 1948, Serial No. 58,044

17 Claims. (Cl. 250—20)

This invention relates to signal seeking receivers and particularly to a receiver without moving parts which will scan a predetermined frequency spectrum and will stop automatically when a modulated carrier wave is received.

Conventional signal seeking receivers are used, for example, in automobiles and usually comprise an electric motor for varying a tuning reactance, such as a capacitance, to scan the receiver through a predetermined frequency spectrum. Tuning of the receiver is arrested when a carrier wave of predetermined amplitude is received. However, a motor-driven signal seeking receiver has a number of disadvantages. Thus, the tuning capacitor cannot be driven at a very high speed because if it is the capacitor cannot be stopped exactly at the desired position. Consequently, the broadcast frequency band is usually scanned in 10 seconds so that it may require an objectionable period of time for the receiver to be tuned to the first carrier wave. Even so, it is quite difficult to prevent the motor from overdriving the tuning capacitor. While it is possible to use a clutch between the drive mechanism and the capacitor, the mechanical equipment required for such a motor-driven signal seeking receiver adds to the expense of the receiver. Still other drawbacks of motor-driven signal seeking receivers are the noise which is usually generated by the motor drive and the fact that variations of the supply voltage may alter the tuning of the set.

It is the principal object of the present invention, therefore, to provide an electronic, that is, an inertialess signal seeking receiver which will scan a predetermined frequency spectrum and will instantaneously stop the scanning action as soon as a carrier wave is received, thereby to tune the receiver to the received wave.

Another object of the invention is to provide an electronic signal-seeking receiver which has no moving parts and which will scan a frequency spectrum in a predetermined direction and will stop when the first carrier wave is encountered and which has manually operable means whereby the scanning operation may be initiated at will.

A further object of the invention is to provide a simple, inexpensive receiver of the type referred to which includes additional manually operable means for automatically tuning the receiver to any one of a number of predetermined stations and which will maintain the receiver tuned to the desired station notwithstanding variations of the supply voltage.

An electronic signal-seeking receiver in accordance with the present invention has a frequency determining circuit such as a radio frequency input circuit which includes an inductor having a ferromagnetic core. A ferromagnetic material is defined as a material having a magnetic permeability which varies with the magnetizing force.

The permeability of the ferromagnetic core is varied at a predetermined rate to tune the circuit over a predetermined frequency range such, for example, as the broadcast range. The variation of the permeability of the core is arrested when a modulated carrier wave is received by the receiver. Thus, the permeability of the core may be varied by a scanning voltage generator and may be arrested in response to a direct current control signal developed by a frequency discriminator when a carrier wave is received. A switch may be provided which will cause the scanning action to be continued after the scanning cycle has been interrupted or arrested by the first received wave. Alternatively, it is also feasible to employ push-button tuning whereby the correct tuning of the receiver is achieved by an automatic frequency control system.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
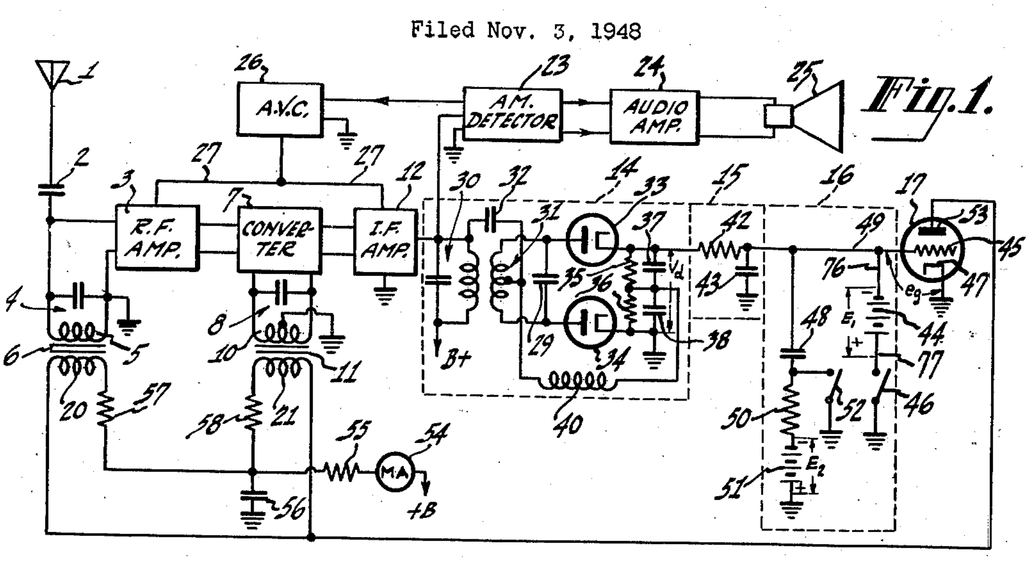
Figure 1 is a circuit diagram, partly in block form, of an electronic signal-seeking receiver embodying the present invention.

Referring now to the drawings in which like components have been designated by the same reference numerals, and particularly to Fig. 1, there is shown a signal-seeking receiver including antenna 1 which is coupled through capacitor 2 to radio-frequency (RF) amplifier 3. Tunable circuit 4 may be connected to the input or to the output of RF amplifier 3 and includes inductor 5 having a ferromagnetic core 6. Core 6 preferably consists of a ferrite which is a mixture of one or more oxides of various bivalent metals with ferric oxide $Fe_2O_3$. The general formula of a ferrite is $Me_1O:Me_2O:Fe_2O_3$, where $Me_1$ may be a metal such as nickel, copper, manganese and magnesium and where $Me_2$ may be a metal such as zinc or cadmium. A ferrite core may be produced by intimately mixing the finely divided metallic oxides, compacting the mixture by compression molding and heating it to a temperature of between 1,000 and 1,600 degrees centigrade. Furthermore, core 6 should consist of a type of ferrite which is not temperature responsive, that is, whereby magnetic permeability does not vary substantially with temperature.

Frequency converter 7 is connected in cascade with RF amplifier 3 and includes a local oscillator having a frequency determining oscillatory circuit 8. Oscillatory circuit 8 also includes an inductor 10 having a ferromagnetic core 11 which may also consist of a ferrite. Intermediate-frequency (I. F.) amplifier 12 is connected to converter 7. A frequency discriminator, shown within dotted lines 14, is coupled to I. F. amplifier 12 and its output circuit, in turn, is connected to integrating filter 15. Scanning voltage generator 16 is connected between integrating filter 15 and control amplifier 17, the latter having an output circuit including inductors 20 and 21 connected in parallel. Inductor 20 is magnetically coupled to core 6 while inductor 21 is magnetically coupled to core 11.

The output of I. F. amplifier 12 is also connected to AM detector 23. The demodulated signal derived from detector 23 is impressed upon audio amplifier 24 and reproduced by loud speaker 25. An automatic volume control (AVC) signal may be derived from detector 23 through AVC circuit 26. The AVC signal may be impressed through leads 27 on R. F. amplifier 3 and I. F. amplifier 12 in accordance with conventional practice.

The receiver will intercept a modulated carrier wave by antenna 1 which is amplified by R. F. amplifier 3 and converted to an I. F. wave by converter 7. The I. F. wave is further amplified by I. F. amplifier 12 and is detected by detector 23. The demodulated signal is further amplified by audio amplifier 24 and reproduced by loud speaker 25.

Turning now to the portions of the receiver which embody the present invention, frequency discriminator 14 may be of any conventional type. In Fig. 1 the Seeley discriminator is shown, by way of example, which has been disclosed and claimed in U. S. Patent 2,121,103. Frequency discriminator 14 comprises primary tuned circuit 30 magnetically coupled to secondary tuned circuit 31 including capacitor 29. The high alternating-current potential terminal of primary tuned circuit 30 is coupled through capacitor 32 to the midpoint of the coil of secondary tuned circuit 31 to inject a primary or reference voltage into the secondary circuit. The discriminator network 30, 31, and 32 operates in a well known manner. A frequency deviation of the received wave with respect to the resonant frequency of the network will cause a relative phase shift between the primary or reference voltage injected into circuit 31 and the secondary voltages developed in circuit 31 so that two resultant carrier wave voltages are developed in circuit 31, the relative amplitudes of which are a function of the frequency deviation. These resultant voltages are impressed upon two diodes 33 and 34 which will rectify the resultant voltages. The demodulated signal is developed across load resistors 35 and 36 which are connected across the cathodes of diodes 33 and 34. Load resistors 35 and 36 are individually bypassed for I. F. currents by capacitors 37 and 38 and the junction points of resistors 35, 36 and of capacitors 37, 38 are connected through coil 40 to the midpoint of the coil of secondary circuit 31 to provide a return path for the rectified currents. The cathode of diode 34 is grounded as shown.

The discriminator voltage $V_d$ is developed across load resistors 35, 36, as indicated in Fig. 1. This voltage plotted against detuning of the receiver is shown by curve 41 of Fig. 3 which will be explained more in detail hereinafter.

Integrating filter 15 consists of series resistor 42 having one terminal bypassed to ground by capacitor 43. Integrating filter 15 serves the purpose of removing the modulation component from the discriminator output voltage to develop a direct current control signal which has a magnitude and polarity representative of the difference between the frequency of input circuit 4 and the frequency of a received wave.

Scanning voltage generator 16 is arranged between integrating filter 15 and control amplifier 17 and consists of a voltage source such as battery 44 having its negative terminal connected through lead 76 to lead 49, interconnecting resistor 42 with control grid 45 of amplifier 17. The positive terminal of battery 44 is connected to lead 77 which, in turn, may be connected to ground through manually operable switch 46. The voltage across battery 44 has been designated $E_1$ as shown in Fig. 1 while the voltage between control grid 45 and grounded cathode 47 is designated $e_g$.

Scanning voltage generator 16 further comprises capacitor 48, resistor 50 and another voltage source such as battery 51 connected in series between lead 49 and ground. The junction point between resistor 50 and capacitor 48 may be grounded through switch 52 which is also manually operable.

The output circuit of control amplifier 17 is connected to anode 53 and includes a suitable anode voltage supply shown at +B, a milliamperemeter 54 and dropping resistor 55 bypassed to ground by capacitor 56. Inductors 20 and 21 are connected in parallel between dropping resistor 55 and anode 53 and each inductor may have a separate resistor connected in series therewith such as resistors 57 and 58.

The circuit of Fig. 1 operates as follows: Let it be assumed that switch 46 is momentarily closed. This will charge capacitor 43 through a path including leads 49, 76, battery 44, lead 77, switch 46 and ground. We may assume that the voltage of battery 44 is $E_1 = -5$ volts. The negative charge of capacitor 43 will gradually be dissipated through resistors 42, 35 and 36. The voltage $e_g$ applied to control grid 45 will accordingly vary as shown by curve 60 of Fig. 2.

Figures 2, 3, 4, 5:
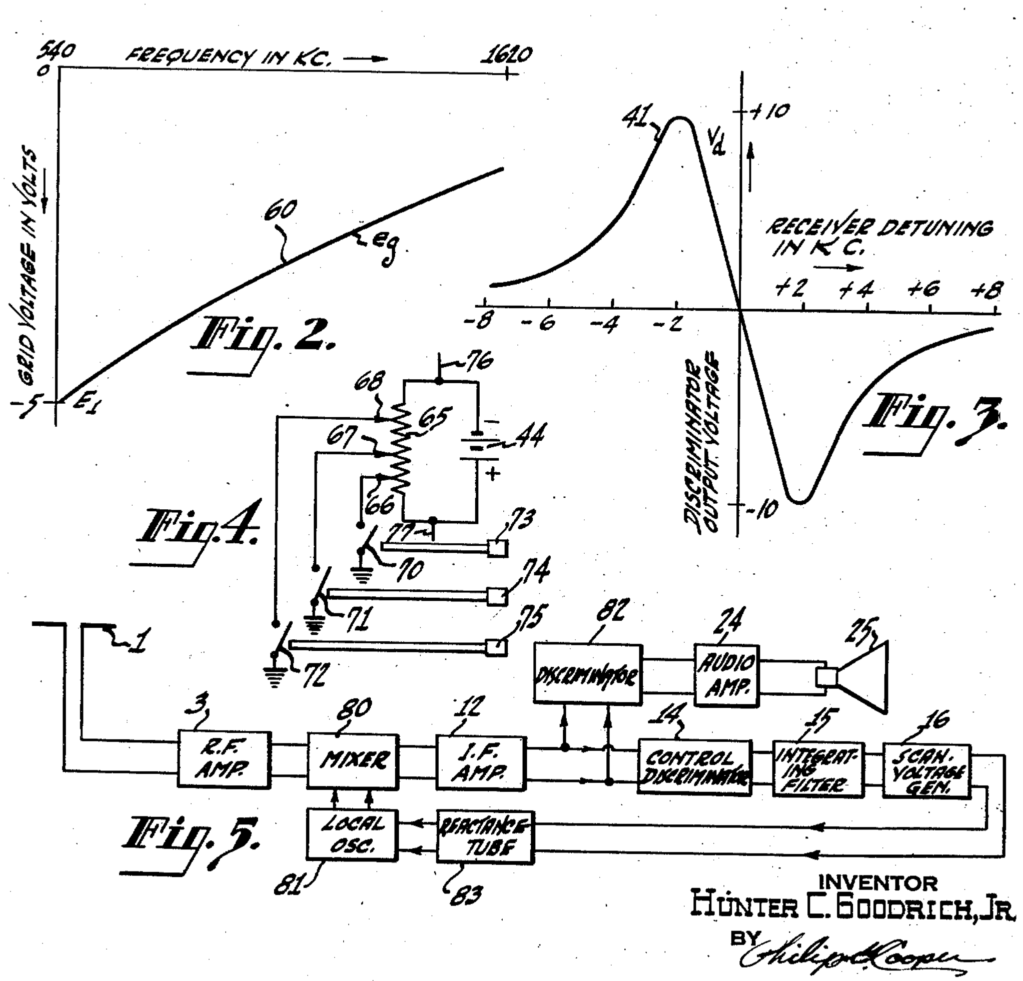
Fig. 2 is a graph illustrating the variation of the receiver tuning frequency with a variation of the scanning voltage.
Fig. 3 is a graph illustrating the output voltage of a frequency discriminator included in the receiver of Fig. 1 with variation of the tuning of the receiver.
Fig. 4 is a schematic diagram of a modification of a portion of the receiver of Fig. 1 whereby push-button tuning is made possible.
Fig. 5 is a block diagram of a modified electronic signal seeking receiver in accordance with the invention.

This will gradually increase the space current through control amplifier 17 and consequently the current flowing through inductors 20 and 21. Since the permeability of cores 6 and 11, which are magnetically coupled to inductors 20 and 21 respectively, is dependent upon the magnetizing force, the resonant frequency of circuits 4 and 8 will gradually increase. Thus, curve 60 of Fig. 2 illustrates the increase of the frequency of tuned circuit 4 with a decrease of the negative voltage impressed on control grid 45.

In order to track input circuit 4 and oscillatory circuit 8, the variation of the permeability of core 11 should be smaller than that of core 6. This may be accomplished in a number of different ways. Thus, resistor 58 may have a larger resistance than resistor 57 so that less current will flow through inductor 21 than through inductor 20. Another possibility is to use different materials for cores 6 and 11 so that the same variation in the magnetizing current will cause a different change in the permeability of the cores. Since the magnetizing force depends upon the ampere turns of inductors 20 and 21, the magnetizing force can be varied by using two inductors, each having a different number of turns. With any one of these methods of tracking of input circuit 4 and oscillatory circuit 8 may be obtained.

Milliamperemeter 54 indicates the plate current of amplifier 17. Hence, meter 54 can be calibrated in frequency because the plate current of amplifier 17 determines the permeability of cores 6 and 11 which in turn determines the frequency to which the receiver is tuned.

As soon as switch 46 is closed, the receiver of Fig. 1 will begin to tune from the low frequency end toward the high frequency end of the desired frequency spectrum. The permeability of cores 6 and 11 will be continuously varied at a fairly rapid rate so that the entire frequency spectrum could be scanned within one second or less.

Let it now be assumed that a modulated carrier wave is received. A discriminator control signal is now developed by discriminator 14, and integrated by filter 15 and impressed upon control grid 45 through lead 49. As illustrated in Fig. 3 when the receiver is tuned to a frequency below that of the received wave, the discriminator control signal will at first be positive, that is, it tends to reduce rapidly the voltage impressed on control grid 45. The tuning of the receiver toward increasing frequencies is therefore accelerated until frequency discriminator 14 is in resonance with the received wave. As shown by curve 41 the discriminator will now develop a zero voltage or a voltage of negative polarity, and the tuning of the receiver will be arrested when the discriminator control signal is sufficient to maintain the receiver tuned to the received wave. The discriminator control signal will maintain capacitor 43 at a fixed voltage in spite of the discharge current flowing through resistors 42, 35 and 36.

Frequency discriminator 14 preferably is arranged so that it will develop a voltage of the order of ±5 volts when the receiver is mistuned by ±1 k. c. (kilocycles). Since the voltage impressed on control grid 45 to tune the receiver through the entire broadcast band is between −5 volts and zero volts, it will be seen that the receiver cannot be mistuned by more than 1 k. c.

It is also feasible to arrange frequency discriminator 14 in such a manner that its resonant frequency is slightly below that of the intermediate frequency so that the tuning error is further reduced. If the voltage of the source +B should vary this would tend to vary the tuning of the receiver. However, since frequency discriminator 14 has an AFC action, tuning of the receiver is maintained at the correct value notwithstanding variations of the voltage supply.

When it is desired to tune the receiver to another station, switch 52 is momentarily closed. This will suddenly ground one terminal of capacitor 48 and consequently the charge of capacitor 43 is reduced. The decrease in voltage of capacitor 43 is equal to $$\frac{E_2 \times C_{48}}{C_{43}+C_{48}}$$

where $E_2$ is the voltage of battery 51, $C_{48}$ is the capacitance of capacitor 48 and $C_{43}$ is the capacitance of capacitor 43. The voltage across capacitor 43 should be decreased sufficiently so that frequency discriminator 14 loses its control. The receiver now continues to scan because the charge on capacitor 43 leaks off through resistors 42, 35 and 36 in the manner previously explained. The scanning action is arrested again when the next carrier wave is encountered. Repeated actuation of switch 52 thus selects each signal of adequate strength within the receiver frequency range in sequence according to frequency.

Resistor 50 should have a large resistance so that capacitor 48 is charged very slowly when switch 52 is opened again. Otherwise, the voltage across capacitor 43 would vary so rapidly that frequency discriminator 14 would lose control of the next encountered carrier wave.

The time constant of voltage supply filter network 55, 56 should be large compared to the time constant of integrating filter 42, 43. A variation of the anode voltage supply +B would ordinarily cause a change of the space current of amplifier 17 which flows through inductors 20 and 21. This will normally cause a change of the permeability of cores 6 and 11, thereby tuning the receiver to a different frequency. However, when the time constant of the filter network 55, 56 is long, the automatic frequency control accomplished by frequency discriminator 14 and integrating filter 15 is able to readjust the tuning of the receiver to hold it at the desired value.

While it will be understood that the circuit specifications of the signal seeking receiver of the invention may vary according to the design for any particular application, the following circuit specifications are included by way of example;

| | | | |
|---|---|---|---|
| Capacitor | **32** | micromicrofarads | 100 |
| Capacitor | **29** | do | 100 |
| Capacitor | **37** | microfarad | .001 |
| Capacitor | **38** | do | .001 |
| Capacitor | **43** | do | .5 |
| Capacitor | **48** | do | .01 |
| Resistor | **35** | ohms | 700,000 |
| Resistor | **36** | do | 700,000 |
| Resistor | **42** | do | 500,000 |
| Resistor | **50** | do | 20,000,000 |
| Battery | **44** | volts | 5 |
| Battery | **51** | do | 5 |

It will be seen that the time constant of the integrating filter consisting of capacitor 43 and resistors 42, 35 and 36 in series is approximately 1 second. Furthermore, the voltage across capacitor 43 changes by the following amount when switch 52 is momentarily closed.

$$\frac{E_2 C_{48}}{C_{43}+C_{48}}=\frac{5\times .01}{.01+.5}\text{ volts}=.1\text{ volts}$$

It is also feasible to tune the receiver of the invention by push-button tuning. To this end the modification of the invention shown in Fig. 4 may be used. Thus, battery 44 which may be connected to lead 76 of Fig. 1 may be shunted by potentiometer 65 having a plurality of taps 66, 67 and 68 each being connected to a normally open grounded switch 70, 71 and 72 respectively. When one of the push buttons indicated schematically at 73, 74 and 75 is actuated, one of the three switches is closed. Thus, assuming that push button 74 is actuated, switch 71 will close so that tap 67 is connected to ground through the switch. Accordingly, a predetermined voltage is applied through leads 76 and 49 to control grid 45 of Fig. 1. This voltage should be such that the receiver is tuned to a frequency slightly below that of the desired station. The receiver is then automatically tuned by the action of discriminator 14 in the manner previously explained.

It is to be understood that any number of switches and push buttons may be provided to select a desired number of stations. It is also feasible to connect lead 77 to switch 46 of Fig. 1 so that the receiver can be used for automatic scanning as previously explained. It will be obvious that frequency discriminator 14 has been shown by way of example only and that any other conventional frequency discriminator may be used instead.

When the frequency band to be covered is small compared to the frequencies to be received, the circuit of Fig. 5 may be used to advantage. Thus, at the present time the frequencies between 88 and 108 m. c. (megacycles) have been allocated for the transmission of frequency-modulated (F. M.) waves. The circuit of Fig. 5 is particularly adapted for the reception of F. M. waves and will be described for that purpose. The modulated carrier wave which may be an F. M. wave, is intercepted by antenna 1 which is preferably a dipole antenna as shown. The thus received wave is amplified by R. F. amplifier 3 and heterodyned by mixer 80 to which is coupled local oscillator 81 including a frequency determining oscillatory circuit. The beat frequency wave developed in mixer 80 is amplified by I. F. amplifier 12 and may be demodulated by discriminator 82. The audio signal derived from discriminator 82 is then amplified by audio amplifier 24 and reproduced by loud speaker 25.

The receiver of Fig. 5 thus far described is a conventional FM receiver and its operation is too well known to require further explanation here. Turning now to the part of the receiver embodying the present invention there is shown schematically control discriminator 14 coupled to I. F. amplifier 12 and followed by integrating filter 15 and scanning voltage generator 16. Preferably, discriminator 14, filter 15 and generator 16 are identical with the corresponding elements of Fig. 1. The voltage derived from scanning voltage generator 16 is impressed upon reactance tube 83 which controls the frequency of the oscillatory circuit of local oscillator 81 in a conventional manner. Two frequency discriminators 14 and 82 are required for the receiver of Fig. 5 because discriminator 14 has a comparatively narrow useful range while discriminator 82 requires a wider range.

The circuit of Fig. 5 operates in substantially the same manner as that of Fig. 1 with the exception that the scanning voltage derived from generator 16 or the control signal developed by discriminator 14 are impressed on reactance tube 83. R. F. amplifier 3 preferably is broadly tuned so that only the oscillatory circuit of local oscillator 81 requires tuning.

There has thus been described a signal seeking receiver of the electronic type which does not have any moving parts. Accordingly, the entire frequency spectrum can be scanned in a very short period of time of the order of 1 second or less. As soon as a carrier wave is encountered the receiver is automatically tuned to the received wave and the tuning is maintained at the desired value regardless of variations of the voltage supply or of a frequency drift of the local oscillator. After the receiver has been tuned to a station, scanning can be resumed by actuating a special switch. Thus, all signals of adequate strength within the frequency range of the receiver can be selected in sequence according to frequency by repeated actuation of the switch. The receiver may also be arranged for push-button tuning to select one of a number of stations.

What is claimed is:

1. An electronic signal seeking receiver comprising a wave transmission channel including a resonant circuit for selecting a signal wave, said resonant circuit having an inductor including a ferromagnetic core; and apparatus for varying the permeability of said core at a predetermined rate to tune said resonant circuit over a predetermined frequency range, said apparatus comprising a scanning voltage generator coupled to said channel for developing a scanning voltage of constantly decreasing amplitude in a predetermined direction, a control circuit coupled to said generator and responsive to said scanning voltage, said control circuit being coupled to said core to vary the permeability of said core in dependence upon the current flowing in said scanning voltage generator, thereby to scan a predetermined frequency spectrum in a predetermined direction, and means coupled to said scanning voltage generator for arresting the variation of the permeability of said core in response to a received signal wave.

2. An electronic signal seeking receiver comprising a wave transmission channel including a resonant circuit for selecting a modulated carrier wave, said resonant circuit having an inductor including a ferromagnetic core; apparatus for carying the permeability of said core at a predetermined rate to tune said resonant circuit over a predetermined frequency range; and a device for arresting the variation of the permeability of said core when a modulated carrier wave is received by said receiver, said device comprising circuit means coupled to said channel for developing a direct current control signal of a magnitude and polarity representative of the difference between the frequency of said resonant circuit and the frequency of the received wave; said apparatus comprising a scanning voltage generator coupled to said channel for developing a scanning voltage of a gradually decreasing amplitude, and a further inductor magnetically coupled to said core, said further inductor being responsive to said scanning voltage and to said control signal to vary the permeability of said core in a predetermined direction in dependence upon the current flowing in said further inductor in response to said scanning voltage, said current being maintained at a fixed value in response to said control signal, thereby to hold the frequency of said resonant circuit substantially at a value to tune said receiver to the received wave, and circuit means coupled to said scanning voltage generator for momentarily decreasing the amplitude of said scanning voltage, thereby to continue varying the frequency of said resonant circuit in said predetermined direction after its frequency has been held at said value.

3. An electronic signal seeking receiver comprising a wave transmission channel including a resonant circuit for selecting a modulated carrier wave, said resonant circuit having an inductor including a ferromagnetic core; apparatus for varying the permeability of said core at a predetermined rate to tune said resonant circuit over a predetermined frequency range; and a device for arresting the variation of the permeability of said core when a modulated carrier wave is received by said receiver, said device comprising circuit means coupled to said channel for developing a direct current control signal of a magnitude and polarity representative of the difference between the frequency of said resonant circuit and the frequency of the received wave; said apparatus comprising a scanning voltage generator coupled to said circuit means for developing a scanning voltage, of an amplitude varying with time, said generator comprising a capacitor forming part of said circuit means, a voltage source, and switching means for momentarily connecting said source across said capacitor to charge it to a predetermined voltage, said capacitor being discharged through a path including said circuit means, and a control circuit responsive to said scanning voltage and to said control signal and including a further inductor magnetically coupled to said core to vary the permeability of said core in dependence upon the current flowing in said further inductor in response to said scanning voltage, said current being maintained at a fixed value in response to said control signal, thereby to hold the frequency of said resonant circuit substantially at a value to tune said receiver to the received wave.

4. An electronic signal seeking receiver comprising a wave transmission channel including a resonant circuit for selecting a modulated carrier wave, said resonant circuit having an inductor including a ferromagnetic core; apparatus for varying the permeability of said core at a predetermined rate to tune said resonant circuit over a predetermined frequency range; and a device for arresting the variation of the permeability of said core when a modulated carrier wave is received by said receiver, said device comprising a frequency discriminator coupled to said channel and having an output circuit for developing a direct current control signal of a magnitude and polarity representative of the difference between the frequency of said resonant circuit and the frequency of the received wave; said apparatus comprising a scanning voltage generator coupled to said discriminator for developing a scanning voltage of a gradually decreasing amplitude, said generator comprising a capacitor forming part of said discriminator output circuit, a voltage source, and switching means for momentarily connecting said source across said capacitor to charge it to a predetermined voltage, said capacitor being discharged through a path including said discriminator output circuit, a control circuit coupled to said generator and responsive to said scanning voltage and to said discriminator control signal, said control circuit including a further inductor magnetically coupled to said core to vary the permeability of said core in dependence upon the current flowing in said control circuit in response to said scanning voltage, said current being maintained at a fixed value in response to said control signal, thereby to hold the frequency of said resonant circuit substantially at a value to tune said receiver to the received wave, and circuit means coupled to said capacitor for momentarily varying the voltage across said capacitor, thereby to continue tuning of said resonant circuit after its frequency has been held at said value.

5. An electronic signal seeking receiver comprising a wave transmission channel including a resonant circuit for selecting a modulated carrier wave, said resonant circuit having an inductor including a ferromagnetic core; apparatus for varying the permeability of said core at a predetermined rate to tune said resonant circuit over a predetermined frequency range; and a device for arresting the variation of the permeability of said core when a modulated carrier wave is received by said receiver, said device comprising a frequency discriminator coupled to said channel and having an output circuit for developing a direct current control signal of a magnitude and polarity representative of the difference between the frequency of said resonant circuit and the frequency of the received wave; said apparatus comprising a scanning voltage generator coupled to said discriminator for developing a scanning voltage of a gradually decreasing amplitude, said generator comprising a capacitor forming part of said discriminator output circuit, a voltage source, and switching means for momentarily connecting said source across said capacitor to charge it to a predetermined voltage, said capacitor being discharged through a path including said discriminator output circuit, an amplifier coupled to said generator and arranged to be driven by said scanning voltage and by said discriminator control signal, a control circuit for said amplifier including a further inductor magnetically coupled to said core to vary the permeability of said core in dependence upon the current flowing in said control circuit in response to said scanning voltage, said current being maintained at a fixed value in response to said control signal, thereby to hold the frequency of said resonant circuit substantially at a value to tune said receiver to the received wave, and circuit means coupled to said capacitor for momentarily varying the voltage across said capacitor, thereby to continue tuning of said resonant circuit after its frequency has been held at said value.

6. An electronic signal seeking receiver comprising a wave transmission channel including a resonant circuit for selecting a modulated carrier wave, said resonant circuit having an inductor including a ferromagnetic core; apparatus for varying the permeability of said core at a predetermined rate to tune said resonant circuit over a predetermined frequency range; and a device for arresting the variation of the permeability of said core when a modulated carrier wave is received by said receiver, said device comprising a frequency descriminator coupled to said channel and having an integrating filter connected thereto for developing a direct current control signal of a magnitude and polarity representative of the difference between the frequency of said resonant circuit and the frequency of the received wave; said apparatus comprising a scanning voltage generator coupled to said filter for developing a scanning voltage of a gradually decreasing amplitude, said generator comprising a capacitor forming part of said filter, a voltage source, and switching means for momentarily connecting said source across said capacitor to charge it to a predetermined voltage, said capacitor being discharged through a path including said filter and said discriminator, an amplifier coupled to said capacitor and responsive to said scanning voltage and to said discriminator control signal, an output circuit for said amplifier including a further inductor magnetically coupled to said core to vary the permeability of said core in dependence upon the current flowing in said output circuit in response to said scanning voltage, said current being maintained at a fixed value in response to said control signal, thereby to hold the frequency of said resonant circuit substantially at a value to tune said receiver to the received wave.

7. An electronic signal seeking receiver comprising a wave transmission channel including a resonant circuit for selecting a modulated carrier wave, said resonant circuit having an inductor including a ferromagnetic core; apparatus for varying the permeability of said core at a predetermined rate to tune said resonant circuit over a predetermined frequency range; and a device for arresting the variation of the permeability of said core when a modulated carrier wave is received by said receiver, said device comprising a frequency discriminator coupled to said channel and having an output circuit including a load resistor, an integrating filter consisting of a further resistor and a capacitor connected across said resistors for developing a direct current control signal of a magnitude and polarity representative of the difference between the frequency of said resonant circuit and the frequency of the received wave; said apparatus comprising a scanning voltage generator coupled to said filter for developing a scanning voltage of a gradually decreasing amplitude, said generator comprising a voltage source, and switching means for momentarily connecting said source across said capacitor to charge it to a predetermined voltage, said capacitor being discharged through said resistors, an amplifier coupled to said capacitor and responsive to said scanning voltage and to said discriminator control signal, a control circuit for said amplifier including a further inductor magnetically coupled to said core to vary the permeability of said core in dependence upon the current flowing in said output circuit in response to said scanning voltage, said current being maintained at a fixed value in response to said control signal, thereby to hold the frequency of said resonant circuit substantially at a value to tune said receiver to the received wave.

8. An electronic signal seeking receiver comprising a wave transmission channel including a resonant circuit for selecting a modulated carrier wave, said resonant circuit having an inductor including a ferromagnetic core; apparatus for varying the permeability of said core at a predetermined rate to tune said resonant circuit over a predetermined frequency range; a device for arresting the variation of the permeability of said core when a modulated carrier wave is received by said receiver, said device comprising a frequency discriminator coupled to said channel and having an integrating filter connected thereto for developing a direct current control signal of a magnitude and polarity representative of the difference between the frequency of said resonant circuit and the frequency of the received wave; said apparatus comprising a scanning voltage generator coupled to said filter for developing a scanning voltage of a gradually decreasing amplitude, said generator comprising a capacitor forming part of said filter, a voltage source, and switching means for momentarily connecting said source across said capacitor to charge it to a predetermined voltage, said capacitor being discharged through a path including said filter and said discriminator, an amplifier coupled to said capacitor and responsive to said scanning voltage and to said discriminator control signal, and output circuit for said amplifier including a further inductor magnetically coupled to said core to vary the permeability of said core in dependence upon the current flowing in said output circuit in response to said scanning voltage, said current being maintained at a fixed value in response to said control signal, thereby to hold the frequency of said resonant circuit substantially at a value to tune said receiver to the received wave; and means for continuing at will the variation of the permeability of said core including a charge storage means and a further switch for momentarily and suddenly reducing the charge on said capacitor, thereby to continue to decrease the amplitude of said scanning voltage until another carrier wave is encountered.

9. An electronic signal seeking receiver comprising a wave transmission channel including a resonant circuit for selecting a modulated carrier wave, said resonant circuit having an inductor including a ferromagnetic core; apparatus for varying the permeability of said core at a predetermined rate to tune said resonant circuit over a predetermined frequency range; a device for arresting the variation of the permeability of said core when a modulated carrier wave is received by said receiver, said device comprising a frequency discriminator coupled to said channel, an integrating filter connected thereto for developing a direct current control signal of a magnitude and polarity representative of the difference between the frequency of said resonant circuit and the frequency of the received wave; said apparatus comprising a scanning voltage generator coupled to said filter for developing a scanning voltage of a gradually decreasing amplitude, said generator comprising a first capacitor forming part of said filter, a voltage source, and switching means for momentarily connecting said source across said first capacitor to charge it to a predetermined voltage, said first capacitor being discharged through a path including said filter and said discriminator, an amplifier coupled to said first capacitor and responsive to said scanning voltage and to said discriminator control signal, an output circuit for said amplifier including a further inductor magnetically coupled to said core to vary the permeability of said core in dependence upon the current flowing in said output circuit in response to said scanning voltage, said current being maintained at a fixed value in response to said control signal, thereby to hold the frequency of said resonant circuit substantially at a value to tune said receiver to the received wave; and means for continuing at will the variation of the permeability of said core comprising a second capacitor, a resistance impedance element and a further voltage source connected serially across said first capacitor, and a switch for momentarily and suddenly discharging said second capacitor, thereby to alter suddenly the charge on said first capacitor and to continue the discharge thereof until another carrier wave is received.

10. An electronic signal seeking receiver comprising a wave transmission channel including a resonant circuit for selecting a modulated carrier wave, said resonant circuit having an inductor including a ferromagnetic core; apparatus for varying the permeability of said core at a predetermined rate to tune said resonant circuit over a predetermined frequency range; and a device for arresting the variation of the permeability of said core when a modulated carrier wave is received by said receiver, said device comprising a frequency discriminator coupled to said channel, an integrating filter connected thereto for developing a direct current control signal of a magnitude and polarity representative of the difference between the frequency of said resonant circuit and the frequency of the received wave; said apparatus comprising a scanning voltage generator coupled to said filter for developing a scanning voltage of a gradually decreasing amplitude, said generator comprising a capacitor forming part of said filter, a voltage source, and switching means for momentarily connecting said source across said capacitor to charge it to a predetermined voltage, said capacitor being discharged through a path including said filter and said discriminator, an amplifier coupled to said capacitor and responsive to said scanning voltage and to said discriminator control signal, an output circuit for said amplifier including a further inductor magnetically coupled to said core to vary the permeability of said core in dependence upon the current flowing in said output circuit in response to said scanning voltage, said current being maintained at a fixed value in response to said control signal, thereby to hold the frequency of said resonant circuit substantially at a value to tune said receiver to the received wave, a potentiometer connected across said voltage source, and a plurality of manually operable switches associated with said potentiometer for charging said capacitor at will to one of a plurality of different voltages.

11. An electronic signal seeking receiver of the superheterodyne type comprising a resonant input circuit for selecting a modulated carrier wave, said input circuit having a first inductor including a first ferromagnetic core, a local oscillator having a frequency determining oscillatory circuit, said oscillatory circuit having a second inductor including a second ferromagnetic core, a mixer coupled to said input circuit and to said oscillator, and an intermediate frequency amplifier channel coupled to said mixer; apparatus for varying the permeability of said cores to tune said input and said oscillatory circuits over predetermined frequency ranges; and a device for arresting the variation of the permeability of said cores when a modulated carrier wave is received by said receiver, said device comprising a frequency discriminator coupled to said channel, an integrating filter connected to said discriminator for developing a direct current control signal of a magnitude and polarity representative of the difference between the frequency of said input circuit and the frequency of the received wave; said apparatus comprising a scanning voltage generator coupled to said filter for developing a scanning voltage of a gradually decreasing amplitude, means for momentarily changing at will the scanning voltage of said scanning generator, an amplifier coupled to said generator and responsive to said scanning voltage and to said discriminator control signal, an output circuit for said amplifier including a third and a fourth inductor, each being magnetically coupled to one of said cores to vary the permeability thereof in dependence upon the current flowing in said output circuit in response to said scanning voltage, said current being maintained at a fixed value in response to said control signal, thereby to hold the frequency of said input and oscillatory circuits substantially at a value to tune said receiver to the received wave.

12. An electronic signal seeking receiver of the superheterodyne type comprising a local oscillator having a frequency determining oscillatory circuit, said oscillatory circuit having an inductor including a ferromagnetic core, a mixer coupled to said oscillator, and an intermediate-frequency amplifier channel coupled to said mixer; apparatus for varying the permeability of said core to tune said receiver over a predetermined frequency range; and a device for arresting the variation of the permeability of said core when a modulated carrier wave is received, said device comprising a frequency discriminator coupled to said channel and having an output circuit for developing a direct current control signal of a magnitude and polarity representative of the deviation of the intermediate frequency wave from the difference between the frequency of said oscillatory circuit and the frequency of the received wave; said apparatus comprising a scanning voltage generator coupled to said discriminator for developing a scanning voltage of gradually decreasing magnitude, switch means coupled to said generator for actuating said generator to initiate one scanning cycle, and circuit means coupled between said generator and said oscillator including a further inductor magnetically coupled to said core to vary the permeability of said core in response to said scanning voltage and to hold the frequency of said oscillatory circuit at a fixed value in response to said control signal, thereby to tune said receiver to the received wave.

13. An electronic signal seeking receiver of the superheterodyne type comprising a local oscillator having a frequency determining oscillatory circuit, said oscillatory circuit having an inductor including a ferromagnetic core, a mixer coupled to said oscillator, and an intermediate frequency amplifier channel coupled to said mixer; apparatus for varying the permeability of said core to tune said receiver over a predetermined frequency range; and a device for arresting the variation of the permeability of said core when a modulated carrier wave is received, said device comprising a frequency discriminator coupled to said channel and having an output circuit for developing over a predetermined range of frequency a direct current control signal of a magnitude and polarity representative of the deviation of the intermediate frequency wave from the difference between the frequency of said oscillatory circuit and the frequency of the received wave; said apparatus comprising a scanning voltage generator coupled to said discriminator for developing a scanning voltage of gradually decreasing magnitude, said generator comprising a capacitor included in said output circuit, a voltage source, switch means for selectively connecting said source across said capacitor to charge it and to initiate one scanning cycle, and a resistive path for discharging said capacitor at a predetermined rate, and a circuit coupled between said capacitor and said oscillator and including a further inductor magnetically coupled to said core to vary the permeability of said core in response to said scanning voltage and to hold the frequency of said oscillatory circuit at a fixed value in response to said control signal, thereby to tune said receiver to the received wave.

14. An electronic signal seeking receiver of the superheterodyne type comprising a local oscillator having a frequency determining oscillatory circuit, said oscillatory circuit having an inductor including a ferromagnetic core, a mixer coupled to said oscillator, and an intermediate frequency amplifier channel coupled to said mixer; apparatus for varying the permeability of said core to tune said receiver over a predetermined frequency range; and a device for arresting the variation of the permeability of said core when a modulated carrier wave is received, said device comprising a frequency discriminator coupled to said channel and having an output circuit for developing a direct current control signal of a magnitude and polarity representative of the deviation of the intermediate frequency wave from the difference between the frequency of said oscillatory circuit and the frequency of the received wave; said apparatus comprising a scanning voltage generator coupled to said discriminator for developing a scanning voltage of gradually decreasing magnitude, said generator comprising a capacitor included in said output circuit, a voltage source, switch means for selectively connecting said source across said capacitor to charge it and to initiate one scanning cycle, and a resistive path included in said output circuit for discharging said capacitor at a predetermined rate, means for momentarily interrupting said scanning cycle and coupled to said capacitor, and a circuit connection between said capacitor and said oscillator including a further inductor magnetically coupled to said core to vary the permeability of said core in response to said scanning voltage and to hold the frequency of said oscillatory circuit at a fixed value in response to said control signal, thereby to tune said receiver to the received wave.

15. An electronic signal seeking receiver of the superheterodyne type comprising a local oscillator having a frequency determining oscillatory circuit, a mixer coupled to said oscillator, and an intermediate frequency amplifier channel coupled to said mixer; apparatus for varying the resonant frequency of said oscillatory circuit to tune said receiver over a predetermined frequency range; and a device for arresting the variation of said resonant frequency when a modulated carrier wave is received, said device comprising a frequency discriminator coupled to said channel and having an integrating filter for developing a direct current control signal of a magnitude and polarity representative of the deviation of the intermediate frequency wave from the difference between the frequency of said oscillatory circuit and the frequency of the received wave; said apparatus comprising a scanning voltage generator coupled to said discriminator for developing a scanning voltage of gradually decreasing magnitude, said generator comprising a capacitor included in said filter, a voltage source, manually operable switch means for selectively connecting said source across said capacitor to charge it, and a resistive path included in said filter and in said discriminator for discharging said capacitor at a predetermined rate, and a reactance tube coupled between said capacitor and said oscillator to vary said resonant frequency in response to said scanning voltage and to hold said resonant frequency at a fixed value in response to said control signal, thereby to tune said receiver to the received wave.

16. An electronic signal seeking receiver of the superheterodyne type comprising a local oscillator having a frequency determining oscillatory circuit, a mixer coupled to said oscillator, and an intermediate frequency amplifier channel coupled to said mixer; apparatus for varying the resonant frequency of said oscillatory circuit to tune said receiver over a predetermined frequency range; a device for arresting the variation of said resonant frequency when a modulated carrier wave is received, said device comprising a frequency discriminator coupled to said channel and having an integrating filter for developing a direct current control signal of a magnitude and polarity representative of the deviation of the intermediate frequency wave from the difference between the frequency of said oscillatory circuit and the frequency of the received wave; said apparatus comprising a scanning voltage generator coupled to said discriminator for developing a scanning voltage of gradually decreasing magnitude, said generator comprising a capacitor included in said filter, a voltage source, manually operable switch means for selectively connecting said source across said capacitor to charge it, and a resistive path included in said filter and in said discriminator for discharging said capacitor at a predetermined rate, a reactance tube coupled between said capacitor and said oscillator to vary said resonant frequency in response to said scanning voltage and to hold said resonant frequency at a fixed value in response to said control signal, thereby to tune said receiver to the received wave; and means for continuing at will the variation of said resonant frequency including a charge storage means and a further switch for momentarily and suddenly reducing the charge on said capacitor, thereby to continue to decrease the amplitude of said scanning voltage until another carrier wave is encountered.

17. An electronic signal seeking receiver of the superheterodyne type comprising a local oscillator having a frequency determining oscillatory circuit, a mixer coupled to said oscillator, and an intermediate frequency amplifier channel coupled to said mixer; apparatus for varying the resonant frequency of said oscillatory circuit to tune said receiver over a predetermined frequency range; a device for arresting the variation of said resonant frequency when a modulated carrier wave is received, said device comprising a frequency discriminator coupled to said channel and having an integrating filter for developing a direct current control signal of a magnitude and polarity representative of the deviation of the intermediate frequency wave from the difference between the frequency of said oscillatory circuit and the frequency of the received wave; said apparatus comprising a scanning voltage generator coupled to said discriminator for developing a scanning voltage of gradually decreasing magnitude, said generator comprising a first capacitor included in said filter, a voltage source, manually operable switch means for selectively connecting said source across said first capacitor to charge it, and a resistive path included in said filter and in said discriminator for dischargng said first capacitor at a predetermined rate, a reactance tube coupled between said first capacitor and said oscillator to vary said resonant frequency in response to said scanning voltage and to hold said resonant frequency at a fixed value in response to said control signal, thereby to tune said receiver to the received wave; and means for continuing at will the variation of said resonant frequency comprising a second capacitor, a resistive impedance element and a further voltage source connected serially across said first capacitor, and a switch for momentarily and suddenly discharging said second capacitor, thereby to alter suddenly the charge on said first capacitor and to continue the discharge thereof until another carrier wave is received.

HUNTER C. GOODRICH, JR.

REFERENCES CITED

The following references are of record in the file of this patent:

UNITED STATES PATENTS

| Number | Name | Date |
|---|---|---|
| 2,287,925 | White | June 30, 1942 |
| 2,288,120 | Challis | June 30, 1942 |
| 2,452,683 | Rieke | Nov. 2, 1948 |
| 2,454,128 | Boothroyd | Nov. 16, 1948 |